(12) United States Patent
Arms et al.

(10) Patent No.: US 6,901,654 B2
(45) Date of Patent: Jun. 7, 2005

(54) METHOD OF FABRICATING A COIL AND CLAMP FOR VARIABLE RELUCTANCE TRANSDUCER

(75) Inventors: Steven W. Arms, Williston, VT (US); Michael J Hamel, Williston, VT (US); Steven Ward Mundell, S. Burlington, VT (US); Christophor Pruyn Townsend, Shelburne, VT (US)

(73) Assignee: Microstrain, Inc., Williston, VT (US)

( * ) Notice: Subject to any disclaimer, the term of this patent is extended or adjusted under 35 U.S.C. 154(b) by 0 days.

(21) Appl. No.: 09/757,909

(22) Filed: Jan. 10, 2001

(65) Prior Publication Data

US 2002/0088110 A1 Jul. 11, 2002

Related U.S. Application Data

(60) Provisional application No. 60/174,903, filed on Jan. 10, 2000.

(51) Int. Cl.[7] .............................. H01F 5/02; H01F 3/06
(52) U.S. Cl. ......................... 29/606; 29/602.1; 29/832; 29/840; 29/412; 29/417; 219/121.7; 336/192; 336/200
(58) Field of Search ...................... 29/605, 606, 592.1, 29/594, 595, 593, 602.1, 412, 417, 832, 840, 860; 324/667; 336/192, 200, 96; 340/870.33, 870.31, 870.35; 73/786; 219/121.7, 121.71

(56) References Cited

U.S. PATENT DOCUMENTS

| | | | | | |
|---|---|---|---|---|---|
| 3,196,523 A | * | 7/1965 | Bell | ........................ | 29/155.5 |
| 3,785,046 A | * | 1/1974 | Jennings | .................... | 29/602.1 |
| 4,511,843 A | * | 4/1985 | Thoraval | .................... | 324/338 |
| 4,759,120 A | | 7/1988 | Bernstein | .................... | 29/605 |
| 4,866,573 A | | 9/1989 | Bernstein | .................... | 361/400 |
| 4,934,048 A | * | 6/1990 | McElhenry et al. | ........... | 29/856 |
| 4,980,663 A | * | 12/1990 | Moyer | .................... | 29/602.1 X |
| 5,016,342 A | * | 5/1991 | Pishaody et al. | ............. | 29/603 |
| 5,265,329 A | * | 11/1993 | Jones et al. | .................... | 29/832 |
| 5,497,147 A | | 3/1996 | Arms | .................... | 340/870.35 |
| 5,572,180 A | | 11/1996 | Huang | ........................ | 336/200 |
| 5,668,702 A | | 9/1997 | Nassimi | .................... | 361/820 |
| 5,777,467 A | | 7/1998 | Arms | .................... | 342/207.18 |
| 5,790,387 A | * | 8/1998 | Gustafson | .................... | 361/807 |
| 5,903,207 A | * | 5/1999 | Lampe, Jr. et al. | ........... | 336/192 |
| 5,914,593 A | | 6/1999 | Arms | .................... | 324/207.12 |
| 5,986,533 A | * | 11/1999 | Person et al. | ............. | 29/412 X |
| 6,189,204 B1 | * | 2/2001 | Shikama et al. | ............. | 29/608 |
| 2002/0088110 A1 | * | 7/2002 | Arms et al. | .................... | 29/606 |

FOREIGN PATENT DOCUMENTS

| | | | | | |
|---|---|---|---|---|---|
| JP | 60-124487 | * | 7/1985 | ............ | 219/121.71 |
| JP | 1-179406 | * | 7/1989 | ................ | 29/602.1 |

* cited by examiner

*Primary Examiner*—A. Dexter Tugbang
(74) *Attorney, Agent, or Firm*—James Marc Leas

(57) ABSTRACT

Improved coils and clamps for variable reluctance sensors are disclosed. A method of fabricating a discrete coil involves providing a conductor wound in a coil on a tube. The coil has a coil outer surface that has insulation. A window is opened in the insulation on the coil outer surface to expose conductor of the coil for a contact. A movable core is provided within the tube for adjusting inductance of the coil. In one embodiment, the coil and tube are diced into small coils after the windows for each coil are opened. Another aspect the invention is a clamp comprising an elastic material, a shape memory alloy, and an apparatus for activating the shape memory alloy. The clamp holds the moveable core in its peak position. When the alloy is activated it changes shape and provides a force on the elastic material to change clamping state for resetting the transducer. The coils and clamps can be used for a variety of purposes in addition to the variable reluctance sensors.

64 Claims, 7 Drawing Sheets

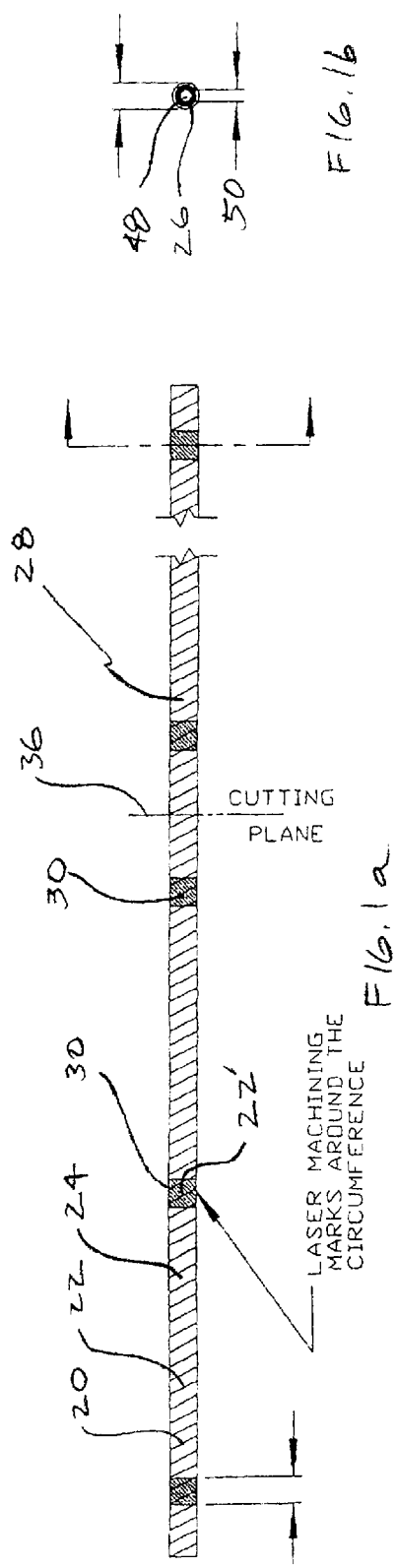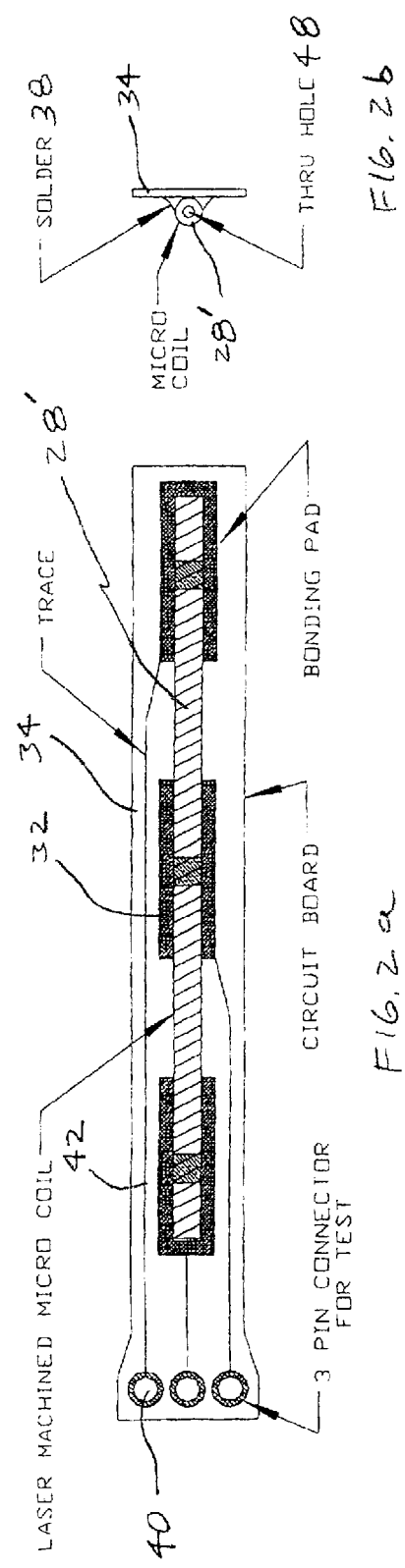

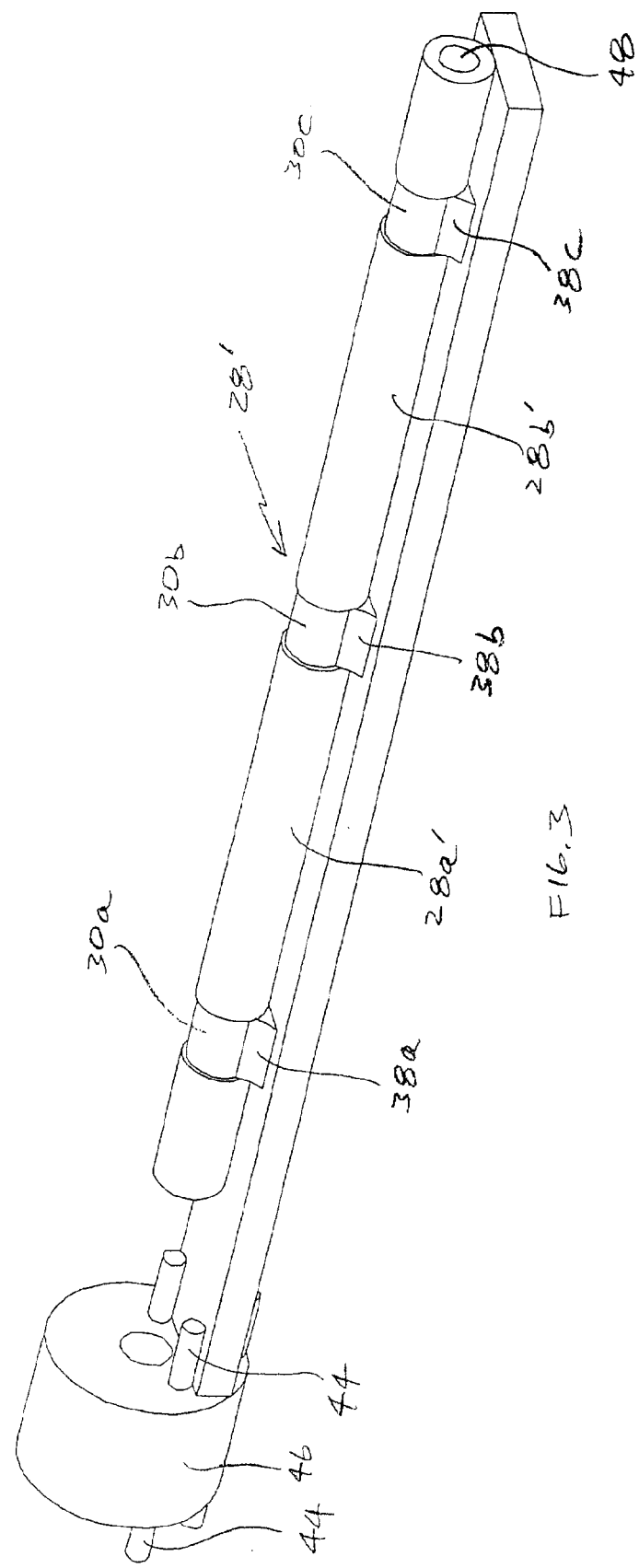

METHOD OF FABRICATING A COIL AND CLAMP FOR VARIABLE RELUCTANCE TRANSDUCER

This application claims the benefit of Provisional application Ser. No. 60/174,903, filed Jan. 10, 2000.

FIELD OF THE INVENTION

This invention generally relates to sensors. More particularly, it relates to a microminiature, differential variable reluctance transducer capable of peak strain detection. Even more particularly, it relates to an improved coil, clamp, and package for such a peak strain detector, and an improved method of manufacturing a coil.

BACKGROUND OF THE INVENTION

Civil and military structures, such as buildings, dams, and bridges can benefit from smart sensors that can report the peak strain to which they have been exposed. Strain to such structures may peak when power is not available, such as during hurricanes, tornadoes, and earthquakes. Devices that do not need power that can measure and record the extent of strain that may have occurred at these times are especially important. Similarly, structures that are repeatedly stressed, such as helicopter and aircraft landing gear, and which may need to be repaired, reinforced, or replaced if strain exceeds a threshold, could benefit from strain monitoring, but these structures are difficult and expensive to permanently instrument by hard wires to a data recorder. Sensitive instruments may also be subject to rough handling during transport, but data recorders powered by batteries may not be a practical or cost effective monitoring solution for such instruments. Similarly, recording details of what happens in a vehicular collision or in a collision between athletes can be of substantial value, and advantage here is especially great for a device that does not require a source of power for making its measurement. In addition to sensors for peak displacement and strain detection, it is desirable to also provide sensors for peak acceleration, force, pressure, and torque.

Commonly assigned U.S. Pat. No. 5,777,467 to Arms, et al, ("the '467 patent") incorporated herein by reference, describes a novel ultra-miniaturized differential variable reluctance transducer assembly encased in stainless steel. The assembly contains a free sliding, magnetically permeable core and two coils surrounding the core. A split ring mounting adapter system allows for a variable gauge length and interchangeable mounting pins. A highly flexible core carrier tube and support wire allows for significant bending without failure, does not interfere with the coils detection of the core, and protects the core from corrosion. A sleeve strain relief sheath has been incorporated with the sensor to avoid excessive strain to lead wires during and after installation. The position of the core is detected by measuring the coils' differential reluctance and transmitted by means of wires or telemetry to measuring equipment. However, while the '467 patent is suitable for differential strain detection, it does not provide for holding a peak strain reading.

Commonly assigned patent application Ser. No. 09/259, 615 to Arms, et al, ("the '615 application") incorporated herein by reference, describes a passive peak strain detector that is especially useful in circumstances where power is unavailable. The patent application demonstrated that tiny, peak strain detection devices with high strain resolution are fabricated using a differential variable reluctance transducer with an entrapment collar that provides a circumferential load to the core to constrain it from free sliding, holding the peak strain measurement for reading at a later time. No power is required for making the reading. However, tiny coils, such as those used for the variable reluctance sensors described in both the '467 patent and in the '615 application, have windings with delicate wires that are difficult to handle and difficult to interconnect with other circuitry.

In U.S. Pat. No. 4,759,120 to Bernstein ("the '120 patent"), discloses a coil wound around a core. Insulation is removed from the wire either during or after winding at predetermined locations to match the location of connection pads in a conductive pattern on a substrate. The coil is appropriately aligned and laid down on the substrate and an attachment technique is used to form an electrical connection between the exposed areas of wire and connection pads on the substrate. The '120 patent provides for varying the inductance of the coil so formed by controlling the location of openings in the insulation. However, the '120 patent provides no way of varying the inductance of the coil after mounting to the substrate.

Similarly, the spring loaded entrapment collar disclosed in the '615 application has no adjustment, and the very large force required to reset the device makes reuse impractical.

Thus, a better system for manufacturing, handling, and using coils and clamps is needed to provide lower cost variable reluctance sensors that can detect and hold a peak reading, and clamps that can be reset, and these solutions are provided by the following invention.

SUMMARY OF THE INVENTION

It is therefore an object of the present invention to provide a scheme for making contact to a coil that does not rely on contacting ends of delicate wires while providing for variable reluctance after mounting on a substrate;

It is a further object of the present invention to provide a robust scheme for manufacturing and contacting coils that is more reliable and also much less expensive to fabricate;

It is a further object of the present invention to provide a movable core for a coil with windows in insulation that allows for surface mounting the coil on a printed circuit board or other substrate;

It is a further object of the present invention to provide a clamp that uses a shape memory alloy to provides a controllable force for holding position of the core within the coil;

It is a further feature of the present invention that connection is made through windows opened in insulation on a surface of a coil wrapped on a tube and having a moveable core inside the tube; and It is an advantage of the present invention that a sensor is lower cost and more robust as a result of having a surface mountable coil with a moveable coil that provides variable reluctance and a shape memory alloy clamp for holding peak displacement of the core.

These and other objects, features, and advantages of the invention are accomplished by a method of fabricating a discrete coil. The method involves providing a conductor wound in a coil on a tube. The coil has a coil outer surface. The coil outer surface has insulation. A window is opened in the insulation on the coil outer surface to expose conductor of the coil for a contact. A movable core is provided within the tube for adjusting inductance of the coil.

Another aspect the invention is also a method of fabricating a discrete coil. This method involves providing a conductor wound in a coil. The coil has a coil outer surface. The coil outer surface has insulation. A plurality of windows are opened in the insulation on the coil outer surface to expose conductor of the coil for contacts. The coil is diced into a plurality of short coils. Each short coil has at least one window in the insulation.

Another aspect of the invention is a discrete winding, comprising a conductor wound in a coil on a tube. The coil has a coil outer surface. The coil outer surface has insulation. A window in the insulation exposes the conductor of the coil for a contact to the conductor. A movable core is within the tube for adjusting inductance of the coil.

Another aspect of the invention is a clamp comprising an elastic material, a shape memory alloy, and an apparatus for activating the shape memory alloy. When the alloy is activated it changes shape and provides a force on the elastic material to change clamping state.

BRIEF DESCRIPTION OF THE DRAWINGS

The foregoing and other objects, features, and advantages of the invention will be apparent from the following detailed description of the invention, as illustrated in the accompanying drawings, in which:

FIG. 1a is a top view of a coil of the present invention;

FIG. 1b is a cross sectional view of the coil;

FIG. 2a is a top view of the coil of FIG. 1 a mounted on a printed circuit board;

FIG. 2b is a cross sectional view of the coil and printed circuit board;

FIG. 3 is an oblique view of the coil and a hermetic seal mounted on the printed circuit board;

FIG. 5a is a side view of the hermetically sealed sensor showing hermetic seals;

FIG. 5b is a bottom view of the hermetically sealed sensor of FIG. 5a;

FIG. 5c is a top view of the hermetically sealed sensor of FIG. 5a;

DETAILED DESCRIPTION OF THE INVENTION

Figure 4:
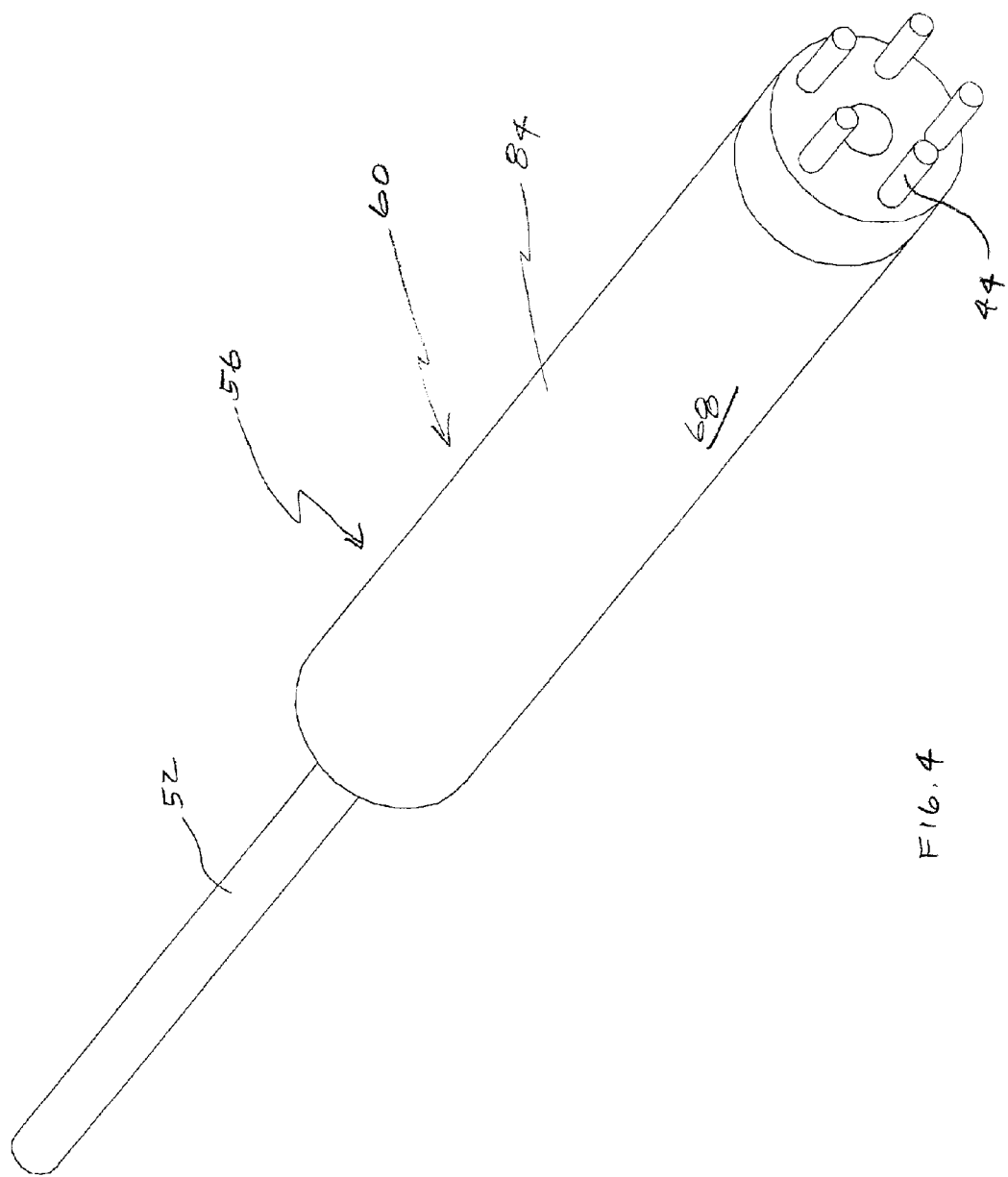
FIG. 4 is an oblique view of the hermetically sealed sensor and core.

The present inventors recognized that a coil for their peak strain detector could be fabricated and handled more efficiently if contacts are formed on the surface of a coil that is wound on a hollow tube, avoiding the need to make contact to ends of delicate wires of the coil, while permitting use of a moveable core within the tube.

The present inventors also recognized that the surface mount approach allows a further lowering of the cost of fabricating coils for their peak strain detectors by integrating steps for many coils into a step for a single coil: A long coil is be wound. All the windows needed for contacts are opened, for example by laser ablation in the long coil. Then the long coil is diced into the short coils needed for an application, and each is surface mounted on a substrate using the windows in the insulation for the contacts. Thus winding of individual short coils is avoided, and handling reduced, providing higher reliability and lower cost.

The present inventors also found an improved clamp for their peak strain detector that is far more controllable. The improved clamp takes advantage of properties of shape memory alloys. The shape of the shape memory alloy is adjusted by a method such as providing a current. This exerts a force on elastic clamping members, controlling the clamping state of the clamp. Thus, a controllable clamp is provided, and this is used for resetting the displacement sensor for reuse after data has been read.

Finally, the present inventors recognized that a hermetically sealed housing provides significant advantage for long term reliability, particularly in recognition of the fact that in bridges and other civil structures, sensors with life spans of many decades are required.

Wire 20 comprising conductor 22 and insulator 24 is wound on long tube 26 to form long coil 28, as shown in FIGS. 1a, 1b. Conductor 22 is formed of copper, gold plated copper, tungsten, or another conductor; insulator 24 of a material such as polyimide, polyurethane Enamel, nylon, polyester, glass fibers, polybutarate, or polyvinyl; and tube 26 of a non-magnetic material such as a polymer, ceramic, or glass. Polyimide, polyimide insulated stainless steel tubing, or fused silica can also be used.

Tube 26 can be quite long, as shown by the top view in FIG. 1a. A 4 foot long coil was fabricated, for example, but much longer or shorter lengths can be used. Windows 30 in insulator 24 are formed as rings extending around coil 28, exposing conductor 22' in windows 30 at locations as required for connection to pads 32 of substrate 34, as shown in FIGS. 2a and 2b. Windows 30 are formed by a process such as laser ablating, sand blasting, or masking and chemical etching that removes affected areas of insulator 24 without damaging conductor 22' thereby exposed. Laser ablation can be performed using a $CO_2$ laser to remove polyurethane. An excimer laser in an argon ambient can be used to ablate polyimide. Such services may be provided by Resonetics, Nashua, N.H., Once windows 30 have been formed along coil 28, coil 28 is diced into short coils 28', along cutting plane 36, as shown in FIG. 2a. Winding a long coil and opening windows in the long coil for contact allows mass production, which reduces cost and complexity that would be required for performing these steps on short coils. Forming and using windows 30 for surface mount contact to a substrate also substantially reduces cost as compared with contacting ends of delicate wire 22' (not shown).

After dicing, short coil 28' is mounted on and connected to substrate 34 by soldering exposed conductor 22' in windows 30 of short coil 28' to pads 32 of substrate 34 to form solder joints 38, as shown in FIGS. 2a, 2b.

Gold plated 48 gauge copper wire with polyurethane insulation was found to be compatible with solder reflow temperatures and $CO_2$ laser ablation. Gold plated copper provides advantage since it eliminates the need for tin plating, has unlimited shelf life, reduces winding resistance, improves coil Q factor, and facilitates direct bonding with commercial solder pastes without adding substantially to cost.

Pads 32 on substrate 34 can be substantially wider than windows 30 in insulator 24, as shown in FIG. 2a, to facilitate alignment there between. Surface mounting short coil 28' to substrate 32 is also facilitated by providing ring shaped windows 30 in insulator 24 since coil 28' can then be mounted to substrate 34 rotated in any orientation. However, windows 30 can also be provided along one side of coil 28'; in this case that side must be oriented down on substrate 34.

Solder paste can be placed on substrate pads 32 before coil 28 is placed in position. Then after coil 28 is aligned and placed on substrate 34, the assembly is heated to reflow the solder paste and then cooled to form solder joints 38. Substrate 32 is a printed circuit board, integrated circuit chip, ceramic substrate, multi-layer ceramic, or flexible printed circuit material, such as polyimide. Coil 28 and tube 26 are diced with a saw, laser, or mechanical shears.

Pads 32 of substrate 34 are connected to external connection pads 40 with traces 42 formed on substrate 34. External connection pads 40 can be used for testing substrate 34 as well as for soldering directly to hermetic feed through pins 44 for hermetically sealed package 46, as shown in FIG. 3 and FIG. 4.

Figure 5:
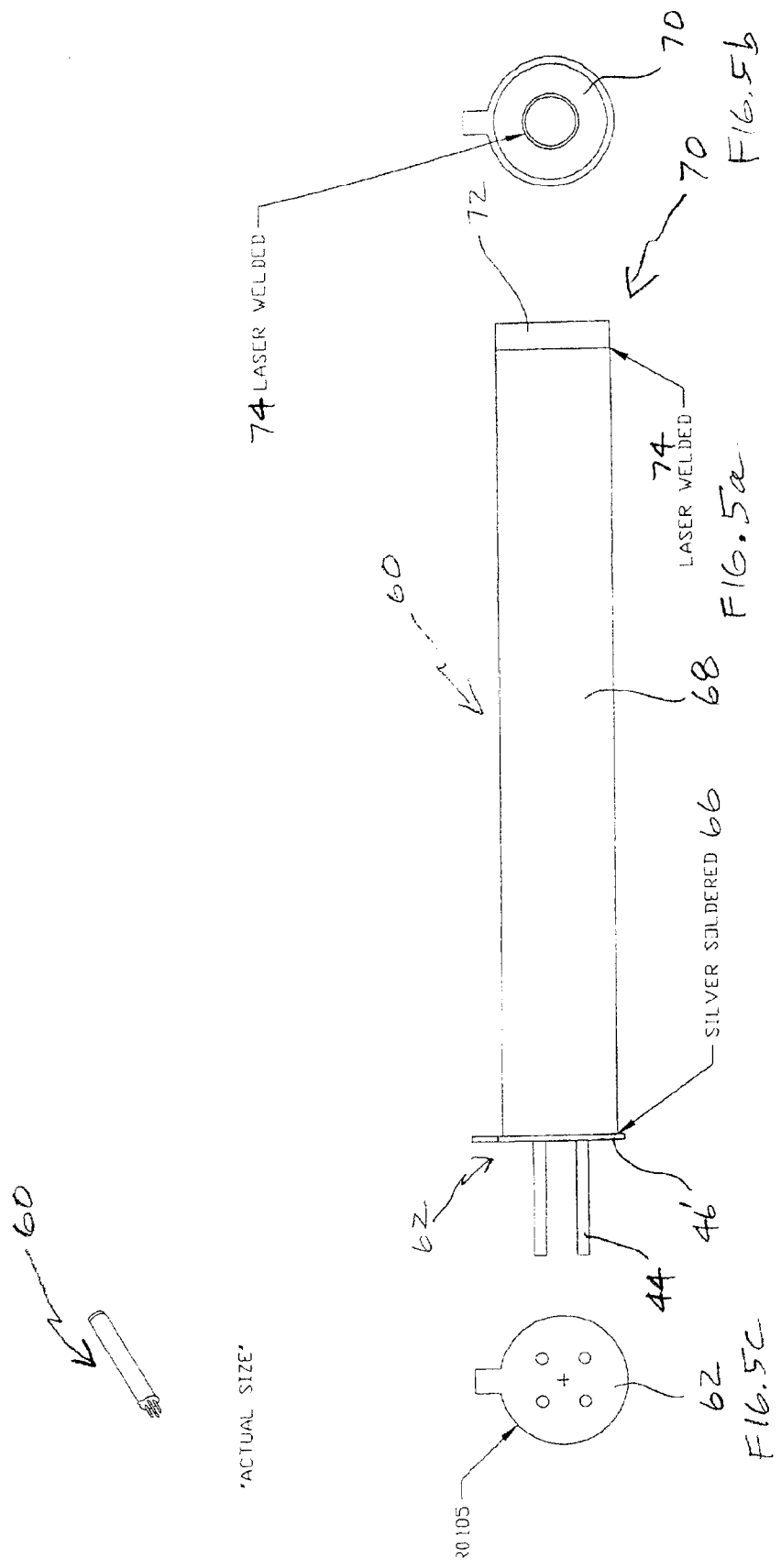

We constructed stainless hermetic package for DVRT 60 using proven laser sealing techniques, as shown in FIG. 5. Back 62 of DVRT 60 uses (MIL-H-28719) stainless/glass/kovar or stainless/glass/stainless feedthrough 46' (Electrovac, Salzweg, Germany), with four pins 44 for solderable termination to flexible, multistrand, shielded leadwires (not shown). For applications where a connector is desirable, a miniature circular connector (Lemo Electronic Connector, Santa Rosa, Calif.) may be combined with a micro O-ring (Apple Products, Boston, Mass.) for connection to the pins (not shown).

Silver solder 66 was used to seal feedthrough 46' to stainless steel shell 68 of DVRT 60, at back 62. At front 70 of DVRT 60, end cap 72 was welded to both stainless steel coil tube 26 and stainless steel shell 68 at weld 74. This packaging scheme will present only stainless steel and glass materials to the environment, providing an excellent barrier to moisture ingress. Hermetic sealing was validated with helium leak testing and saline soak testing. As an alternative, both ends could be welded or both soldered depending on whether feedthrough 46' is stainless steel or gold plated kovar. Alternatively shell 68 could be made out of a polymer. Shell 68 could be injection molded around DVRT 60 and connectors 44 to provide a hermetic seal, for example.

Short tube 26' has through hole 48 having inside diameter 50 sufficient to accommodate moveable core 52 that can slide within short tube 26' to adjust the reluctance of short coil 28', as also shown in FIG. 4. Measurement of the reluctance of short coil 28' thus gives indication of the displacement of moveable core 52 within short tube 26'. Slender moveable core 52, which may have a diameter of 20 mils, is fabricated of a flexible tube of superelastic nickel titanium, which allows sensor 56 to tolerate significant out-of-axis strains; this tube also contains a slug of magnetic material. Sensor 56 can be a DVRT or another displacement sensor.

In operation, a peak differential variable reluctance transducer (DVRT) is attached to a structure at two points, as described in the '615 application. Tensile strain in the structure being measured provides a powerful force causing core 52 to be pulled out of hole 48 in body 84 of sensor 56. Spring loaded entrapment collar 80 (FIGS. 6, 7a, 7b, 7c, 8) that is integral with body 84 and applies a circumferential load to core 52. When the powerful force causing tensile strain in the structure ends, spring loaded entrapment collar 80 is strong enough to prevent further movement of core 52. Therefore, peak tensile strains are stored in the physical location of core 52. This result is achieved without any electrical power being applied. Thus, the device provides a physical location for the peak displacement. This location can later be measured by measuring the inductance of coil 28' which gives direct indication of the location of core 52 within hole 48 in coil 28', and the displacement of core 52 from a known starting position. A differential coil arrangement, as shown in FIG. 2a and FIG. 3, is used to amplify core position and to cancel the effect of changes in temperature, as described in the '467 patent and in commonly assigned U.S. Pat. No. 5,497,147 to Arms, et al, incorporated herein by reference, ("the '147 patent"). Coil 28' comprises coil 28a' located between solder connectors 38a and 38b in windows 30 0a and 30b and coil 28b' located between solder connectors 38b and 38c in windows 30b and 30c. A temperature gradient compensation circuit as described in U.S. Pat. No. 5,914,593 to Arms, et al, incorporated herein by reference, ("the '593 patent"), can also be used. Entrapment collar 80 need not be circumferential. It can apply force to one side or opposite sides of core 52, for example.

The inventors further provided two schemes for resetting the peak strain detector for repeated measurement (using remote electrical connections) by employing a shape memory actuator. In order to reset the peak strain detector, a mechanical force is needed that is greater than the spring entrapment collar's retaining force, which tends to maintain the core's position.

The first scheme is a shape memory alloy (SMA) spring. When the SMA spring is allowed to carry an electrical current, its temperature rises, and if allowed to rise above its transformation temperature, the spring will begin to expand, and this expansion can be used to push the peak detect core back into the DVRT coils, resulting in a (remotely activated) resetting of the device.

The inventors built and tested SMA springs but found that they had lower than expected force output so more than 3 amps of current were required for actuation. Less current was required if an entrapment collar requiring less clamping pressure was used. But less clamping pressure was undesirable since the core could slip or lose its peak displacement position especially in an environment subject to vibration.

Figure 6:
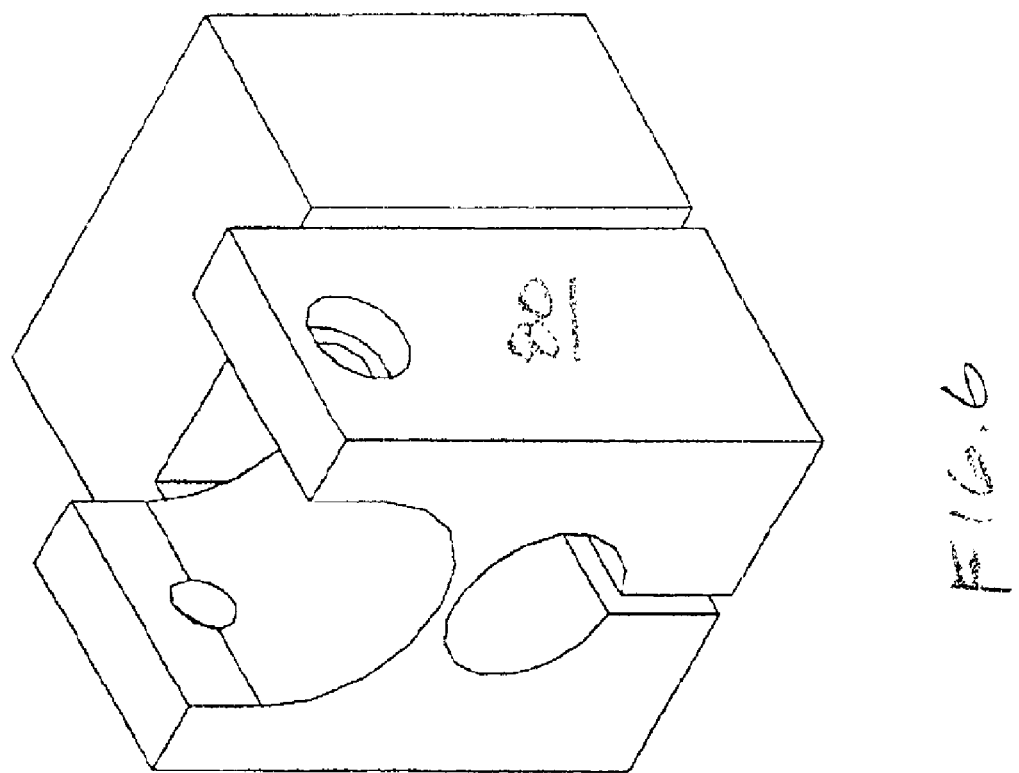
FIG. 6 is an oblique view of a clamp of the present invention.

A new entrapment collar clamp 80 using SMA wire 82 was designed and fabricated by the inventors, as shown in FIG. 6. The new design can actively increase or decrease entrapment clamp force under the control of the user.

Figure 7:
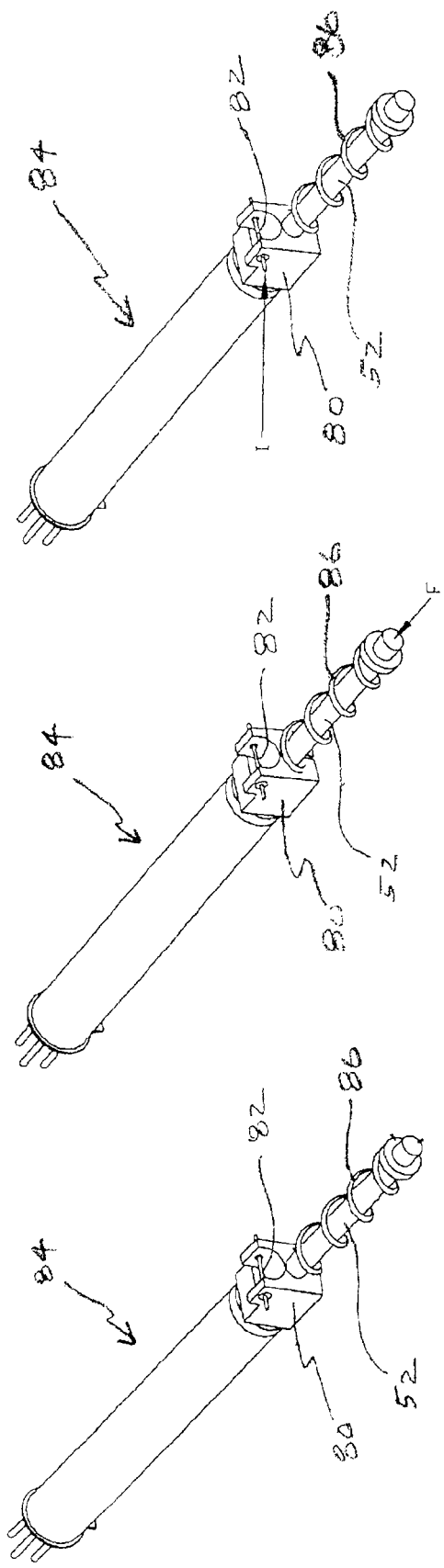
FIG. 7a is an oblique view showing the clamp of the present invention integrated with the sensor in its initial position.
FIG. 7b is an oblique view showing the clamp of the present invention integrated with the sensor in its position after a force has been applied that moves the core through the clamp and within the coil.
FIG. 7c is an oblique view showing the clamp of the present invention integrated with the sensor in its position after current has flowed through the shape memory alloy wire to reset the clamp.
Figure 8:
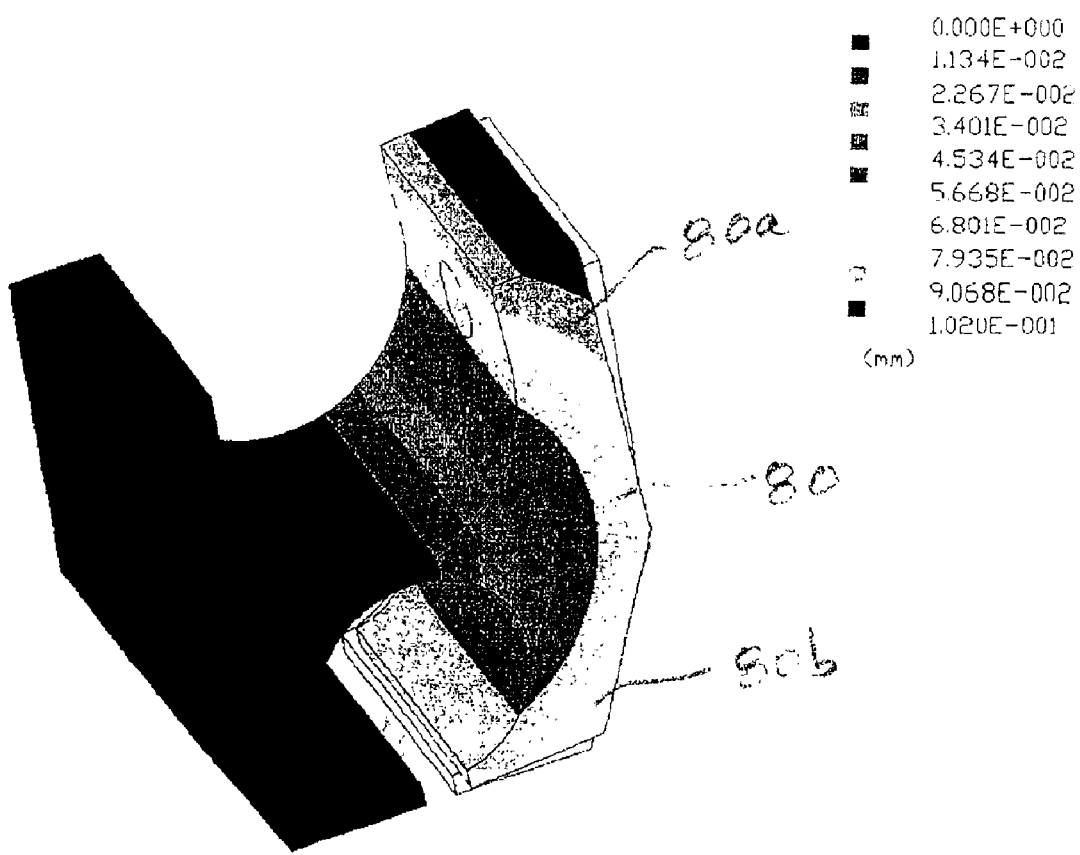
FIG. 8 is an oblique view of a simulation of clamp of the present invention showing displacement of the clamp when various currents flow through the shape memory alloy wire.

The new entrapment clamp 80 is formed of heat treated 400 series stainless steel or any other spring material, and is normally in a closed set to provide a high clamping force on DVRT core 52, as shown in FIG. 6 and FIGS. 7a–7c. SMA actuator is comprised of simple SMA wire 82 (Mondotronics, Inc., San Rafael, Calif.) which shortens upon flow of current through SMA wire 82, as shown in FIGS. 7a–7c. The shortened SMA wire, in turn, exerts a force pulling together top portion 80a of stainless steel entrapment clamp 80 causing its bottom portion 80b to open, as shown in FIG. 8, allowing core 52 to slide.

In use a very high force, such as may be provided by an event such as a collision, storm, or earthquake, causes a strain in the structure to which DVRT 84 is connected. This large force causes movement of DVRT core 52 from the initial position shown in FIG. 7a to its final position in FIG. 7b. Core 52 is forced through clamped entrapment collar clamp 80 by the very high force of the event F. When the event is over, entrapment collar clamp 80 retains DVRT core 52 in its peak displacement position. No force is available to move core 52 back from its peak displacement, and its position can be accurately measured at a later time by determining the change in reluctance of DVRT 84.

Once the peak displacement measurement has been taken, DVRT 84 can be reset for further use. The clamping force provided by entrapment collar clamp 80 on core 52 of DVRT 84 can be reduced or eliminated by the user, by turning on current I to flow through SMA wire 82, as shown in FIG. 7c. This causes SMA wire to contract, exerting a force on stainless steel entrapment collar 80, causing it to open. Reset spring 86 can now slide core 52 back out to its original position. Reset spring 86 does not have to be powerful since clamping force provided by entrapment clamp 80 is temporarily reduced or eliminated as current flows through SMA wire 82. Once reset spring 86 has pushed DVRT core 52 back to its initial position current to SMA actuator wire 82 is turned off. SMA actuator relaxes, lengthening to its original shape, and the high clamping force of entrapment collar clamp 80 is restored. DVRT 84 is now reset for another use.

Finite Element Analyses (FEA) of this new design was performed prior to production in order to refine the design. FIG. 8 indicates the FEA predicted displacements, showing opening of entrapment clamp 80 by about 0.1 mm. From these analyses, the inventors optimized the design and built a functional prototype, as described here.

Reset performance for the clamp of FIG. 6 was documented by % return to full closure over 50 trials. The average clamping force over the 50 trials was measured at 219.9 grams (std. dev.: 35.4 grams), and the average open force was only 0.948 grams (std. dev.: +/−2.6 grams). The 95% confidence interval (C.I.) for the clamped forces range from 149–289 grams; while the 95% C.I. for the unclamped device ranges from 0–6.2 grams. These data show that the force exerted by the SMA entrapment clamp is much higher than the unclamped (SMA actuated) force. Therefore, provided that power can be delivered (temporarily) to generate adequate current (and hence force) through shrinkage of the SMA wire, a spring with a relatively light spring constant will reset the peak detect core reliably. This greatly reduces the potential for the reset spring of causing inadvertent slippage of the core.

As described in the '147 and '467 patents, the transducer can also include a transmitter for wireless data transmission.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of fabricating an electronic device, comprising the steps of:
    a) providing a coil of conductor and an insulation, said coil of conductor having a coil outer surface and a coil inner surface, said insulation on said coil outer surface, said coil of conductor further comprising a coil length;
    b) forming openings in portions of said insulation on said coil outer surface and exposing conductor in said openings for external contacts; and
    c) dicing completely through said coil to provide a plurality of short coils, wherein each said short coil has at least one said opening in said insulation, wherein each of said plurality of short coils has a short coil length that is less than said coil length.

2. The method as recited in claim 1, further comprising the steps of:
    e) providing a substrate; and
    f) surface mounting said coil to said substrate.

3. The method as recited in claim 2, wherein, in said providing step (e), said substrate comprises a printed circuit board, a ceramic substrate, a flexible material, or an integrated circuit.

4. The method as recited in claim 2, wherein said surface mounting step (f) comprises die step of electrically connecting conductor exposed in said opening in said insulation to said substrate.

5. The method as recited in claim 4, further comprising the step of providing a solder or conductive polymer, wherein said electrical connecting step comprises joining with said solder or said conductive polymer.

6. The method as recited in claim 5, wherein said joining step comprises providing solder paste between said substrate and said conductor exposed in said opening and heating to reflow said solder.

7. The method as recited in claim 2, further comprising the step of mounting additional electronics on said substrate.

8. The method as recited in claim 7, further comprising the step of connecting said additional electronics to said coil.

9. The method as recited in claim 8, further comprising the step of providing a housing for holding said coil, said substrate, and said additional electronics.

10. The method as recited in claim 9, further comprising the step of hermetically sealing said housing.

11. The method as recited in claim 9, further comprising the step of providing pins for external connection through said housing.

12. The method as recited in claim 9, wherein said coil and said additional electronics comprise a sensor.

13. The method as recited in claim 12, wherein said sensor comprises a variable reluctance transducer.

14. The method as recited in claim 12, wherein said sensor is for measuring strain, displacement, acceleration, force, or pressure.

15. The method as recited in claim 12, further comprising the step of providing a circuit to correct for temperature variation.

16. The method as recited in claim 15, wherein said circuit is integrated within said housing.

17. The method as recited in claim 15, wherein said circuit is located within signal conditioning electronics separate from said housing.

18. The method as recited in claim 7, wherein said additional electronics provides excitation or synchronous demodulation.

19. The method as recited in claim 7, wherein said additional electronics converts an ac waveform to a dc voltage.

20. The method as recited in claim 1, further comprising the step of enclosing said coil in a housing and hermetically sealing said housing.

21. The method as recited in claim 1, wherein said step of forming openings in portions of said insulation comprises laser ablating said insulation.

22. The method as recited in claim 21, wherein said step of laser ablating said insulation, comprises directing light from a laser on said insulation.

23. The method as recited in claim 22, wherein said laser comprises an excimer laser.

24. The method as recited in claim 21, wherein said coil comprises a plurality of turns of said wire and wherein said step of laser ablating said insulation comprises opening said insulation over a plurality of said turns of wire.

25. The method as recited in claim 21, wherein said step of laser ablating said insulation comprises ablating a ring shaped opening in said insulation.

26. The method as recited in claim 1, wherein said insulation comprises polyimide.

27. The method as recited in claim 1, wherein said step of forming openings in portions of said insulation comprises abrading said insulation.

28. The method as recited in claim 1, wherein said step of forming openings in portions of said insulation comprises chemically etching said insulation.

29. The method as recited in claim 1, further comprising the step of providing a tube, said tube having an outer surface and an inner surface, wherein said providing step (a) comprises providing said coil inner surface and said insulation on a said tube outer surface.

30. The method as recited in claim 29, wherein said providing step (a) comprises the step of providing a wire, and winding said wire around said tube.

31. The method as recited in claim 30, wherein said wire comprises an insulated wire and said step (a) comprises winding said insulated wire around said tube.

32. The method as recited in claim 30, wherein, in said providing step (a), said wire comprises two ends, wherein neither of said ends extends from said coil for contacting.

33. The method as recited in claim 29, further comprising the steps of providing a movable core within said tube inner surface and moving said movable core within said tube inner surface for adjusting inductance of said coil.

34. The method as recited in claim 35, further comprising the step of enclosing said coil in a housing and hermetically sealing said housing.

35. The method as recited in claim 33, wherein said step of forming said openings in portions of said insulation comprises laser ablating said insulation.

36. The method as recited in claim 35, wherein said coil comprises a plurality of turns of said wire and wherein said step of laser ablating said insulation comprises opening said insulation over a plurality of said turns of wire.

37. The method as recited in claim 35, wherein said step of laser ablating said insulation, comprises directing light from a laser on said insulation.

38. The method as recited in claim 37, wherein said laser comprises an excimer laser.

39. The method as recited in claim 35, wherein said step of laser ablating said insulation comprises ablating a ring shaped opening in said insulation.

40. The method as recited in claim 33, further comprising the step of providing a structure for holding position of said core within said tube.

41. The method as recited in claim 40, further comprising the step of providing a structure for resetting position of said core within said tube.

42. The method as recited in claim 41, wherein said structure for resetting position of said core within said tube comprises an electronically controllable clamp.

43. The method as recited in claim 42, wherein said electronically controllable clamp comprises a shape memory alloy.

44. The method as recited in claim 41, wherein said structure for resetting position of said core further comprises a spring so said core can snap to a new position when said clamp is released.

45. The method as recited in claim 29, further comprising the steps of:
   e) providing a substrate; and
   f) surface mounting said coil to said substrate.

46. The method as recited in claim 45, wherein said providing step (e), said substrate comprises a printed circuit board, a ceramic substrate, a flexible material, or an integrated circuit.

47. The method as recited in claim 45, wherein said surface mounting step (f) comprises the step of electrically connecting conductor exposed in said opening in said insulation to said substrate.

48. The method as recited in claim 47, further comprising the step of providing a solder or conductive polymer, wherein said electrical connecting step comprises joining with said solder or said conductive polymer.

49. The method as recited in claim 48, wherein said joining step comprises providing solder paste between said substrate and said conductor exposed in said window and heating to reflow said solder.

50. The method as recited in claim 45, further comprising the step of mounting additional electronics on said substrate.

51. The method as recited in claim 50, wherein said additional electronics converts an ac waveform to a dc voltage.

52. The method as recited in claim 50, further comprising the step of connecting said additional electronics to said coil.

53. The method as recited in claim 52, further comprising the step of providing a housing for holding said coil, said substrate, and said additional electronics.

54. The method as recited in claim 53, further comprising the step of hermetically sealing said housing.

55. The method as recited in claim 53, further comprising the step of providing pins for external connection through said housing.

56. The method as recited in claim 53, wherein said coil and said additional electronics comprise a sensor.

57. The method as recited in claim 56, wherein said sensor comprises a variable reluctance transducer.

58. The method as recited in claim 56, wherein said sensor is for measuring strain, displacement, acceleration, force, or pressure.

59. The method as recited in claim 56, further comprising the step of providing a circuit to correct for temperature variation.

60. The method as recited in claim 59, wherein said circuit is integrated within said housing.

61. The method as recited in claim 59, wherein said circuit is located within signal conditioning electronics separate from said housing.

62. The method as recited in claim 50, wherein said additional electronics provides excitation or synchronous demodulation.

63. A method of fabricating an electronic device, comprising in order, the steps of:
   a) providing a coil of conductor and an insulation, said coil of conductor having a coil outer surface and a coil inner surface, said insulation on said coil outer surface, said coil of conductor further comprising a coil length;
   b) forming openings in portions of said insulation on said coil outer surface and exposing conductor in said openings for external contacts;
   c) dicing through said coil to provide a plurality of short coils, wherein each said short coil has at least one said opening in said insulation, wherein each of said plurality of short coils has a short coil length that is less than said coil length;

d) providing a substrate;

e) surface mounting said coil to said substrate;

f) mounting additional electronics on said substrate;

g) connecting said additional electronics to said coil; and h) providing a housing for holding said coil, said substrate, and said additional electronics.

64. A method of fabricating an electronic device, comprising in order, the steps of:

a) providing a coil of conductor, an insulation, and a tube, said coil of conductor having a coil outer surface and a coil inner surface, said insulation on said coil outer surface, wherein said tube has a tube outer surface and a tube inner surface, and wherein said coil of conductor and said insulation are on said tube outer surface, further wherein said coil of conductor further comprises a coil length;

b) forming openings in portions of said insulation on said coil outer surface and exposing conductor of said coil for contacts;

c) dicing through said coil to provide a plurality of short coils, wherein each said short coil has at least one said opening in said insulation, wherein each of said plurality of short coils has a short coil length that is less than said coil length; and d) providing a movable core within said tube and providing for moving said movable core within said tube for adjusting inductance of said coil.

* * * * *